United States Patent [19]

Muramoto

[11] Patent Number: 5,473,629
[45] Date of Patent: * Dec. 5, 1995

[54] ELECTRONIC CLINICAL THERMOMETER

[75] Inventor: Yutaka Muramoto, Fujinomiya, Japan

[73] Assignee: Terumo Kabushiki Kaisha, Tokyo, Japan

[*] Notice: The portion of the term of this patent subsequent to Nov. 5, 2010, has been disclaimed.

[21] Appl. No.: 313,964

[22] PCT Filed: Aug. 7, 1987

[86] PCT No.: PCT/JP87/00594

§ 371 Date: Nov. 30, 1993

§ 102(e) Date: Nov. 30, 1993

[87] PCT Pub. No.: WO88/01047

PCT Pub. Date: Feb. 11, 1988

[30] Foreign Application Priority Data

Aug. 7, 1986 [JP] Japan .................. 61-184270

[51] Int. Cl.⁶ .................................................. G01K 3/00
[52] U.S. Cl. .................. 374/102; 374/169; 128/736; 364/413.03; 364/557; 364/581
[58] Field of Search .................. 374/102, 103, 374/169, 170, 171; 128/736; 364/413.03, 557, 581

[56] References Cited

U.S. PATENT DOCUMENTS

| 4,541,734 | 9/1985 | Ishizaka | 374/169 |
|---|---|---|---|
| 4,592,000 | 5/1986 | Ishizaka et al. | 374/170 |
| 4,629,336 | 12/1986 | Ishizaka | 374/169 |
| 4,735,512 | 4/1988 | Suzuki | 374/170 |
| 4,811,198 | 3/1989 | Ota et al. | 374/169 |
| 4,843,577 | 6/1989 | Muramoto | 374/102 |
| 4,846,583 | 7/1989 | Yamamoto | 374/170 |
| 4,877,333 | 10/1989 | Ota et al. | 128/736 |
| 4,878,184 | 10/1989 | Okada et al. | 364/557 |

FOREIGN PATENT DOCUMENTS

| 0107374 | 8/1979 | Japan | 374/102 |
|---|---|---|---|
| 58-167932 | 10/1983 | Japan . | |
| 60-165832 | 11/1985 | Japan . | |
| 61-70429 | 4/1986 | Japan . | |
| 2133562 | 7/1984 | United Kingdom | 374/169 |

Primary Examiner—Diego F. F. Gutierrez
Attorney, Agent, or Firm—Frishauf, Holtz, Goodman, Langer & Chick

[57] ABSTRACT

A predictive-type electronic clinical thermometer comprises a temperature sensing unit, a measuring unit for measuring elapsed time from the start of measurement and an arithmetic unit. The arithmetic unit performs a predictive operation in order to obtain a corrective value utilizing one selected prediction function at one time from among a plurality of prediction functions in which elapsed measurement time is a variable, each function defining a temperature change up to a final temperature. The arithmetic unit calculates the equilibrium temperature based upon the obtained corrective value and the sensed body temperature. In a case where an unstable temperature rise curve exhibits a transition not covered by the group of standard curves which are defined by the predictive functions, the prediction operation is suspended immediately and the actually measured temperature value is displayed at such time.

6 Claims, 8 Drawing Sheets

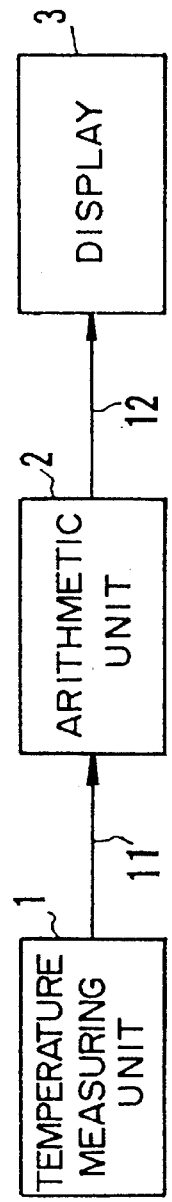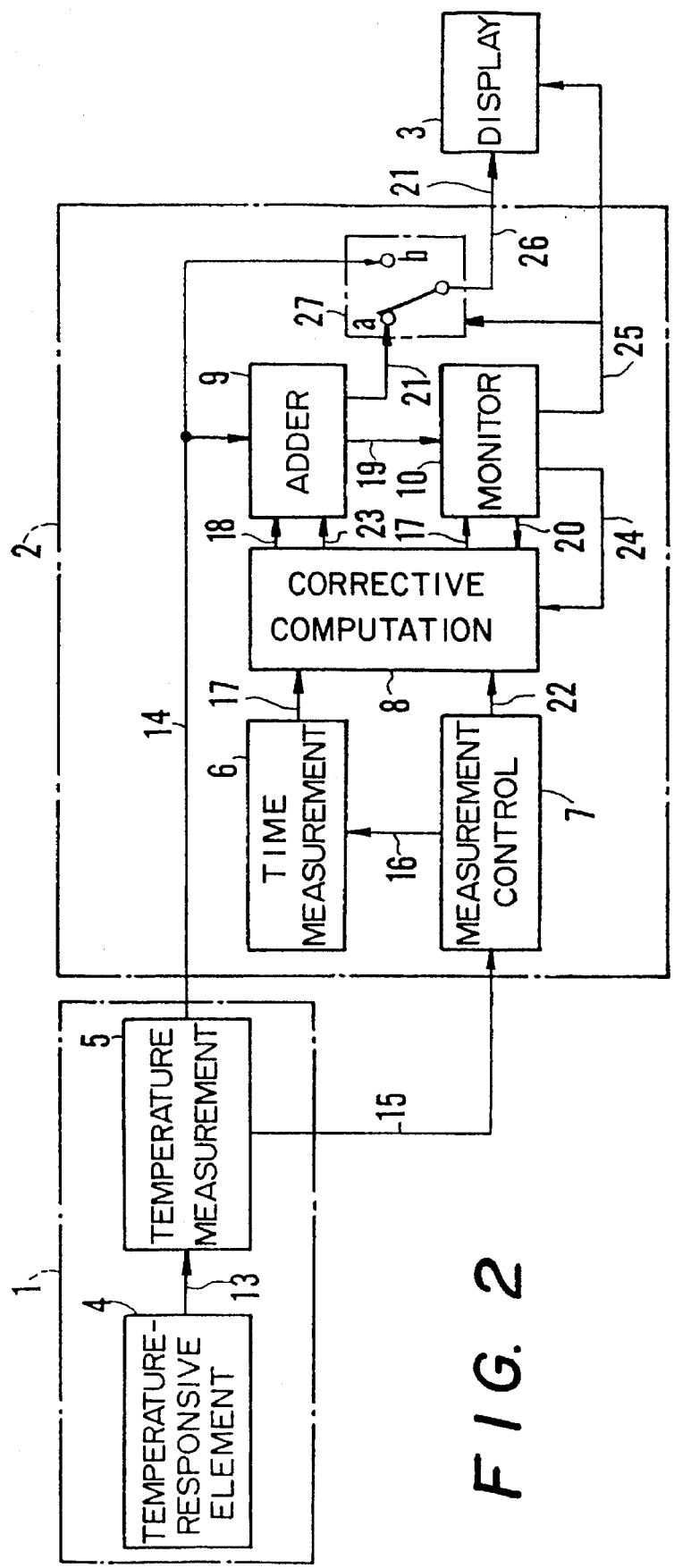

ELECTRONIC CLINICAL THERMOMETER

RELATED U.S. PATENTS AND PATENT APPLICATIONS

U.S. patent applications directly or indirectly related to the subject application are the following:

U.S. Pat. No. 4,541,734, issued Sep. 17, 1985 by Hideo Ishizaka, entitled Electronic Clinical Thermometer, and Method of Measuring Body Temperature;

U.S. Pat. No. 4,592,000, issued May 27, 1986 by Hideo Ishizaka, entitled Electronic Clinical Thermometer, and Method of Measuring Body Temperature;

U.S. Pat. No. 4,574,359, issued Mar. 4, 1986 by Hideo Ishizaka, entitled Electronic Clinical Thermometer, and Method of Measuring Body Temperature; and Ser. No. 748,663, filed Jun. 24, 1985 by Hideo Ishizaka, entitled Electronic Clinical Thermometer, and method of Measuring Body Temperature (now U.S. Pat. No. 4,629,336).

Ser. No. 021,775, filed Mar. 4, 1987 by Yutaka Muramoto, entitled Electronic Clinical Thermometer (now U.S. Pat. No. 4,843,577).

BACKGROUND OF THE INVENTION

This invention relates to an electronic clinical thermometer and, more particularly, to a predicting-type electronic clinical thermometer in which a displayed temperature reading rapidly attains an equilibrium temperature even before temperature is sensed in real time.

The advantage of an electronic clinical thermometer which predicts temperature that will be attained at thermal equilibrium is that the equilibrium temperature is displayed at an early stage during the course of measurement. In an electronic clinical thermometer of this type, the early display of temperature is expected to follow a gradient curve and a predicted value of equilibrium temperature is determined on the bais of the sensed temperature. This difference value shall be referred to as an "add-on value hereinafter. However, when the detected temperature describes an expected curve, the equilibrium temperature cannot be predicted or the reliability of the prediction declines significantly. Though it may be contemplated when such a temperature rise curve is detected, there is very little probalility of success even if re-measurement is effected, and the reliability of the prediction is low even if the re-measurement is successful.

SUMMARY OF THE INVENTION

The present invention is presented to solve the drawbacks of the prior art, and an object of the invention is to provide an electronic clinical thermometer which presents a reliable temperature display in accordance with the measurement conditions.

According to the present invention, the foregoing objects are attained by providing an electronic clinical thermometer comprising temperature sensing means for sensing body temperature, means for measuring elapsed time from the start of measurement, arithmetic means for obtaining a corrective value at that instant utilizing one selected prediction function from among a plurality of predection functions in which elapsed measurement time is a variable, each function defining a temperature change up to a final temperature, predictive calculation means for calculating the equilibrium temperature based upon the obtained corrective value and the sensed body temperature at that instant, evaluating means for evaluating the possibility of establishing a prediction, means for altering the measurement mode to a direct reading mode in accordance with the evaluation made by the evaluating means, and display means for displaying a temperature value obtained in a predictive mode or direct reading mode(a mode for displaying the actually measured temperature value).

According to another aspect of the present invention, the evaluating means evaluates the possibility of establishing a prediction based upon the magnitude of a parameter employed in the prediction function.

In yet another aspect of the present invention, the evaluating means employs the measured elapsed time as one evaluating element.

In a further aspect of the present invention, the electronic clinical thermometer further includes discriminating means for discriminating the measuring mode in which the thermometer is placed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the basic construction of an electronic clinical thermometer according to the present invention;

FIG. 2 is a block diagram illustrating, in some detail, the construction of the electronic clinical thermometer of FIG. 1 according to an embodiment of the present invention;

DETAILED DESCRIPTION

Figures 3, 4:
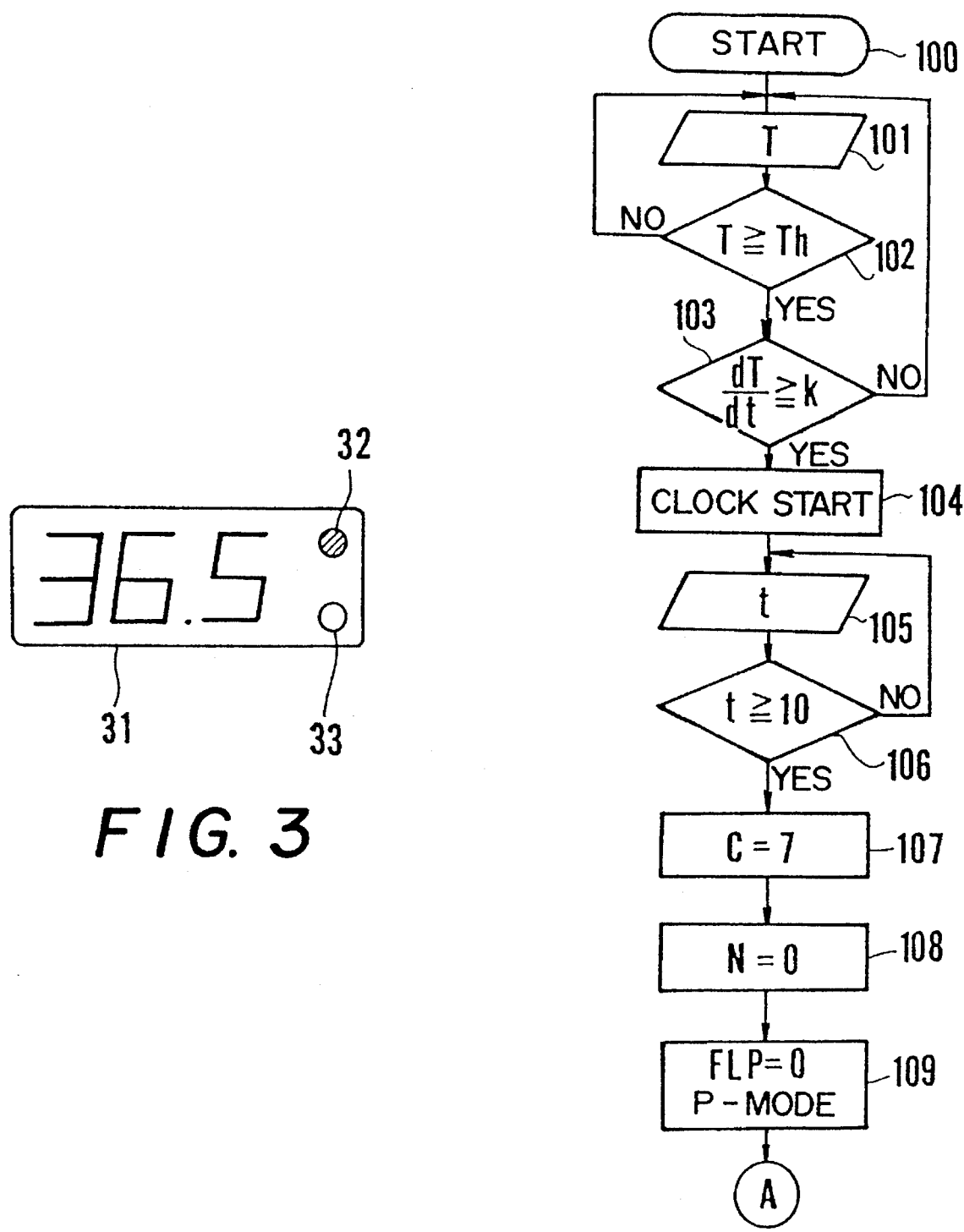
FIG. 3 is a front view of a display unit.
FIGS. 4 and 5 are flowcharts indicating a process through which temperature is predicted at thermal equilibrium in an armpit of a subject.

Reference will now be made to the block diagram of FIG. 1 showing the basic construction of an electronic clinical thermometer according to the present invention. The electronic clinical thermometer basically comprises a temperature measurment unit 1, which detects the temperature of the region where the measurement is performed and produces temperature signals, a prediction operation unit 2 which normally performs a prediction operation for obtaining the equilibrium temperature and in time produces a temperature detected signal when a predetermined situation is detected by the unit 2, and a display unit 3 which displays the temperature data.

The temperature measuring unit 1 comprises circuitry having a temperature responsive element such as a thermistor for real-time temperature measurement of a part of the human body.

The arithmetic unit 2 comprises circuitry for predicting the temperature at thermal equilibrium. For this purpose it monitors, substantially continuously, a detected signal 11 produced by the temperature measuring unit 1. At first, the unit 2 determines conditions for starting prediction, and subsequently predicts the temperature to be attained at thermal equilibrium constantly at short time intervals using the latest information, such as time signal obtained from an internally provided elapsed time measurement function, as well as signal 11 continuously provided by the temperature measurement unit 1, continuously evaluating the suitability of the prediction and concurrently executing weighting processing so that the displayed value of predicted temperature will show a smooth transition. The unit 2 delivers a resulting prediction signal 12 to the display unit 3 substantially continuously until thermal equilibrium is attained. The above mentioned prediction operation is suspended when a decision is made that the temperature signal is not applicable for the prediction, and instead, the temperature signal is delivered to the display unit 3.

The display unit 3 displays a predicted equilibruim temperature or detected temperature. Also, the display unit 3 also provides a function informing the user which measurement mode is in operation.

FIG. 2 is a block diagram illustrating in some detail the construction of an embodiment of an electronic clinical thermometer according to the present invention. In FIG. 2, like reference numerals denote like or corresponding parts in the electronic clinical thermometer of FIG. 1. It should be noted that the figure is a functional block diagram which shows functions which are performed by the stored program fixed in a ROM of a microcomputer. By reading the description thereof given hereinafter, those skilled in the art will be capable of readily understanding thee invention to a degree necessary for working the same.

The temperature measuring unit 1 comprises a temperature responsive element 4 such as a thermistor, and a temperature measuring circuit 5. The latter, which receives an electric signal 13 indicative of sensed body temperature received from the temperature responsive element 4, samples and converts the signal 13 into digital output signals 14, 15 indicative of real-time temperature.

The arithmetic unit 2 for predicting temperature comprises a measurement control circuit 7, a time measuring circuit 6, a corrective value computing circuit 8, an adding circuit 9, a predicted temperature monitoring circuit 10 and a signal switch 27. The measurement control circuit 7 controls the overall operation of the electronic clinical thermometer. This is achieved by constantly monitoring the real-time temperature signal 15 from the temperature measuring circuit 5, and supplying the time measuring circuit 6 with a clock signal 16 and the corrective value computing circuit 8 with a control signal 22 when predetermined measurement conditions are satisfied. The time measuring circuit 6 responds to the clock signal 16 by clocking elapsed time from the start of measurement, producing a signal 17 indicative of the elapsed time.

The corrective value computing circuit 8 computes and produces a signal 18 indicative of a corrective temperature differential (add-on value) for temperature predicting purposes, the value of U being the difference between real-time temperature and temperature attained at thermal equilibrium, in accordance with temperature sensed at sampling instants based upon an input of the elapsed time signal. The corrective value computing circuit 8 also produces a display corrective value signal 23 obtained by weighting the corrective signal 18. The corrective value computing circuit 8 incorporates a function for obtaining the corrective temperature differential as a function of elapsed time. The function includes several parameters which influence the corrective temperature differential. These parameters are set at the initiation of measurement, for example when a control signal 22 from the measurement control circuit is first applied to the computing circuit 8, so as to take on specific values, e.g. values defined such that a temperature rise with elapsed time will be the most likely average temperature change, which is obtained statistically in advance by an actual measurement. As will be described later, the corrective value computing circuit 8 has three functions, The first is to compute the corrective temperature differential corresponding to the elapsed time signal 17 input thereto, the output signal 18 being indicative of the computed value. The second function is to alter, upon receiving a negative feedback control signal 20 from the predicted temperature monitoring circuit 10, the values of the parameters which influence the corrective temperature differential, namely the function for obtaining the corrective temperature differential. The third function is to subject the corrective temperature differential to a weighting operation which is a function of elapsed measurement time, as shown in FIGS. 6(a), (b), thereby outputting the display corrective value signal 23 for the display of predicted temperature.

The adding circuit 9 adds the real-time temperature signal 14 and the corrective signal 18, producing a predicted temperature signal 19, which is the sum of the real-time temperature T(t) and the corrective temperature differential U(t) for predicting purposes. The adding circuit 9 also adds the real-time temperature signal 14 and the display corrective value signal 23, producing a predicted display temperature signal (Tp) 21, which is the sum of the display corrective value (W(t) U(t) for display purposes and the real-time temperature T(t).

The predicted temperature monitoring circuit 10 monitors the signal 19 constantly and decides whether the predicted temperature is within prescribed limits for a prescribed period of time. The monitoring circuit 10 outputs the negative feedback control signal 20 to the computing circuit 8 when the predicted temperature is outside these limits, and outputs a display control signal 24 to the computing circuit 8 for activating the temperature display when said temperature is within the prescribed limits. The predicted temperature monitoring circuit 10 also indirectly judges whether the curve of the real-time temperature signal 14 is applicable to perform the prediction operation. In cases where the decsion is made that the curve is not appropriate, a contact point of switch 27 is shifted to the a-side from the b-side; thus the measurement mode is changed from the prediction mode to the direct reading mode (referred to as D-Mode in the drawings).

In the temperature measuring unit 1, the electronic signal 13 from the temperature responsive element 4 is converted into the signals 14, 15, which are capable of being converted into real-time temperature. The output signal 15 of the temperature measuring circuit 7 immediately applies the clock signal 16 to the time measuring circuit 6 when predetermined conditions are satisfied, e.g. when the signal indicates that a certain temperature has been exceeded at a temperature change in excess of a certain value; that is, the electronic clinical thermometer was brought into contact with the measurement region. At the same time, the control circuit 7 applies the control signal 22 to the corrective value computing circuit 8, thereby giving an instruction to begin.

The corrective value computing circuit 8, upon receiving as an input the elapsed time signal 17 from the time measuring circuit 6, computes the corrective temperature differential for predicting a final temperature, this value being the difference between real-time temperature and temperature attained at thermal equilibrium. The signal 18 indicative of the corrective value is applied to the adding circuit 9. As mentioned above, the corrective temperature differential is incorporated in the corrective value computing circuit 8 as a function solely of elapsed time t including several parameters which influence the corrective temperature differential.

These parameters are reset at the initiation of measurement, for example when the control signal 22 from the measurement control circuit is first applied to the corrective value computing circuit 8 (the signal 22 being applied at the same time that the clock signal 16 is applied to the measurement control circuit 6), so as to take on values which define a specific temperature change. The correctives value computing circuit 8 computes the corrective temperature differential as soon as the elapsed time signal 17 arrives, and delivers the corrective value signal 18 to the adding circuit 9.

The adding circuit 9 receives and takes the sum of the real-time temperature signal and the corrective value signal 18, producing the predicted temperature signal 19 which is the sum of the corrective temperature differential and real-time temperature. The signal 19 is applied as an input to the predicted temperature monitoring circuit 10, which monitors the predicted temperature constantly. When the predicted temperature is constant for a certain period of time, the monitoring circuit 10 regards the results of the corrective temperature value computation performed by the computing circuit 8 as being appropriate. In other words, when the predicted temperature is determined to be constant for a certain time period, the monitoring circuit 10 decides that the selection of the computation process, function and parameter applied in the computation of the corrective temperature value are appropriate. When such is the case, the display control signal 24 is delivered to the corrective value computing circuit 8 and the predicted display temperature signal 21 is produced and applied to the display unit 3. When the predicted temperature falls outside, say, a fixed range of temperature variation within a predetermined period of time, the monitoring circuit 10 applies the negative feedback control signal 20 to the corrective value computing circuit 8. The latter responds by implementing the above-mentioned second function thereof, namely by altering the parameters which influence the corrective temperature differential. Thus, the corrective value computing circuit 8 recomputes the corrective temperature differential, conforming to the elapsed time signal 17, based on the altered parameters. The corrective signal 18, which is the result of this computation, is again applied to the adding circuit 9, the latter producing the predicted temperature signal 19 which is monitored by the predicted temperature monitoring circuit 10.

The predicted temperature monitoring circuit 10 repeats the foregoing process, with the result being that the weighted predicted temperature is displayed by the display unit 3.

The foregoing series of process steps, namely the computation of the corrective temperature differential by the computing circuit 8, the addition operation performed by the adding circuit 9, the monitoring of the predicted temperature by the monitoring circuit 10, the negative feedback applied from the monitoring circuit 10 to the computing circuit 8, and the weighting processing executed when the display is made, are performed in a short period of time, and the predicted temperature displayed on the display circuit 3 is presented substantially continuously and makes a smooth transition.

FIG. 3 is a front view of the display unit 3 which shows a display screen surface, in which 31 denotes a liquid crystal display (LCD) screen. A symbol 32 or 33 is displayed on the LCD screen for incicating that the displayed temperature is the predicted equilibrium temperature or the actual detected temperature. Here the symbol 32 is a sign for the predicted equilibrium temperature and the symbol 33 is for the sign of the detected actual temperature. These symbols are provided for giving information on the measurement state(mode) to users; however, the symbols are not limited to the examples for discriminating the measurement mode. It is possible to adopt a blinking symbolo or to invert black and white on the LCD screen.

Next will be described the process through which a temperature reached on attainment of thermal equilibrium is predicted with the embodiment of FIG. 2. For the discussion, reference will be had to the flowchart of FIG. 4 and 5 and the corrective temperature differential curves illustrated in FIG. 6.

The first item requiring discussion is the corrective temperature differential, represented by U. In measuring body temperature, the time until the attainment of thermal equilibrium differs widely depending upon the thermal characteristics of the clinical thermometer, the state of the part of the body where the temperture is sensed, and the part itself. If the thermal characteristics of the clinical thermometer are limited, the various temperature change patterns can be classified into a number of categories. In other words, placing a limitation upon the thermal characteristics will make it possible to define a number of temperature change patterns. Two major categories of temperature change are those resulting from, say, measurement orally and measurement by placement of the thermometer in an armpit. Several other categories may also be conceived, such as temperature change patterns exhibited by adults and children, but these are not particularly useful. Let us consider measurement of body temperature sensed in an armpit.

With regard to oral measurement, it may be conceived in the same manner with the exception that sets of parameters are different from those for an armpit.

It is known from measurement of armpit temperature for a wide variety of cases that approximately ten minutes is required for attainment of thermal equilibrium. Let U* represent the difference between temperature Te at thermal equilibrium and a temperature T during measurement. Upon investigation, it is found that U* is expressed with good accuracy by the following formula:

$$U(t)^* = Te - T(t) = \alpha t + \beta + C(t+\gamma) \tag{1}$$

where:

U*: difference between equilibrium temperature and temperature during measurement t: time from beginning of measurement C: variable parameter α, β, γ: constants in conformance with measurements taken under constant conditions.

In particular, for measurement of body temperature in an armpit, the following holds with good regularity:

$$U^* = -0.002t + 0.25 + C(t+1)^{-0.6} \quad (2 \leq C \leq 12) \tag{2}$$

where t is measured in seconds and U* in degrees Centigrade.

When U* in Eq. (2) is replaced by U and the value of the parameter is varied from C=2 to C=12, the curves shown in FIG. 4 are the result. The reason for replacing U* with U is that the equilibrium temperature Te corresponds to a predicted temperature Tp as far as execution of the prediction process is concerned. In other words, the corrective temperature differential U during the prediction process is given by the following equation:

$$U = Tp - T(t) \qquad (3)$$
$$= -0.002t + 0.25 + C(t+1)^{-0.6} (2 \leq C \leq 12)$$

Figure 5:
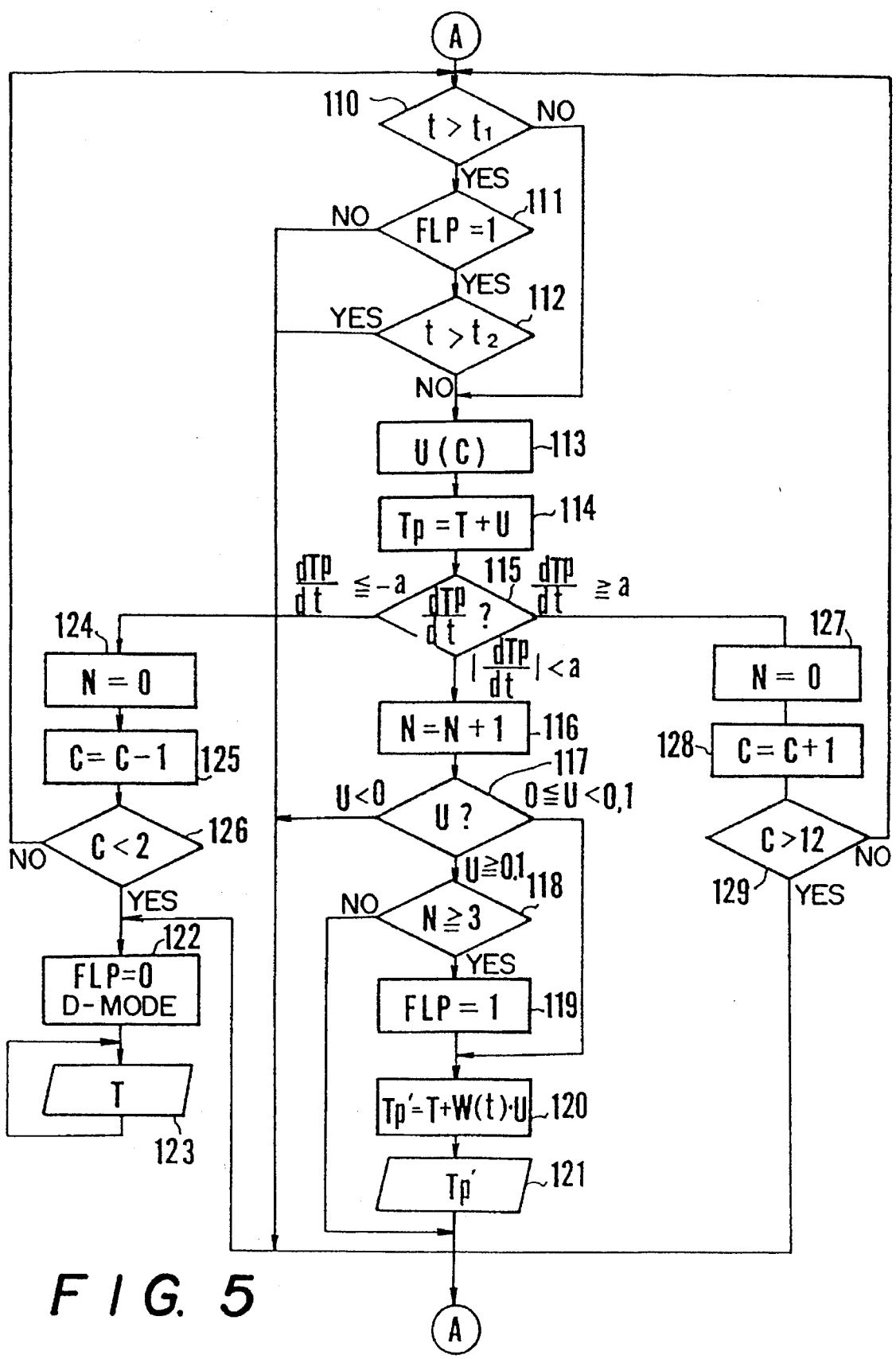

FIGS. 4 and 5 are flowcharts of an algorithm describing the processing for temperature measurement as carried out by, say, the arrangement illustrated in the block diagram of FIG. 2.

With the start step 100, power is introduced to the system to actuate the temperature measuring circuit 5 (FIG. 2), upon which the process moves to a temperature measurement step 101. In this step, the signal 15 from the temperature measuring circuit 5 is monitored by the measurement control circuit 7. In decision steps 102, 103 it is decided whether or not a measurement of body temperature is to be performed. Specifically, in step 102, it is decided whether a predetermined temperature, say a temperature of 30° C. has been exceeded Step 103 decides whether the temperature rise is equal to or greater than 0.1° C. per second.

Both of these decisions are executed by the measurement control circuit 7. If an affirmative decision is rendered in both cases, then the process moves to a step 104 for reset start of the time measurement circuit 6.

In step 104, a counter in the time measuring circuit 6 for measuring elapsed time is reset by the first clock signal 16 generated by the measurement control circuit-7 and, at the same time, an elapsed time measurement begins in step 105. Step 106 is a decision step which calls for waiting a certain period of time until a subsequent temperature prediction step takes on practical meaning. For example, the system waits in standby for ten seconds until start of a computation for a corrective temperature. The reason is that the accuracy of temperature prediction is extremely poor, and would give unsatisfactory results, for a period of less than ten seconds.

When measured results are available for an elapsed time of ten seconds or more, the measurement control circuit 7 produces the control signal 22, which executes an initial setting step 107. In this step, the parameter C of the arithmetic expression incorporated in the corrective temperature value computing circuit 8 is set to a value having the highest probability of leading to a temperature prediction at thermal equilibrium, this being obtained statistically by performing actual measurements in advance.

In the embodiment, C=7 in step 107. Next, step 108 calls for setting 0 to a counter N which is provided for high probability of the prediction.

In step 9 flag FLP is reset because prediction has not yet been established and prediction mode (P-MODE) is displayed on the display unit 3. Next, step 110 calls for determining whether elapsed time t is in excess of a predetermined time t1. Here, the predetermined time t1 is defined to be time within which prediction should be able to be established in the course of ordinary measurement. If it is not judged that prediction is established during this predetermined time period, it is judged that the curve shows unstable factors, thereby terminating the prediction operation. In view of the characteristics of the temperature rise course, the predetermined time t1 for the measurement in the armpit is 100 seconds, and that for oral measurement 70 seconds. Immediately after measurement, such time duration is not sufficient to show a stable temperature rising curve. A computation of the corrective temperature value within the computing circuit 8 is performed, and accordingly, the corrective value signal 18 is delivered to the adding circuit 9. Then, the process moves to step 113 to perform the computation that corresponds to Equation (3).

Figure 6:
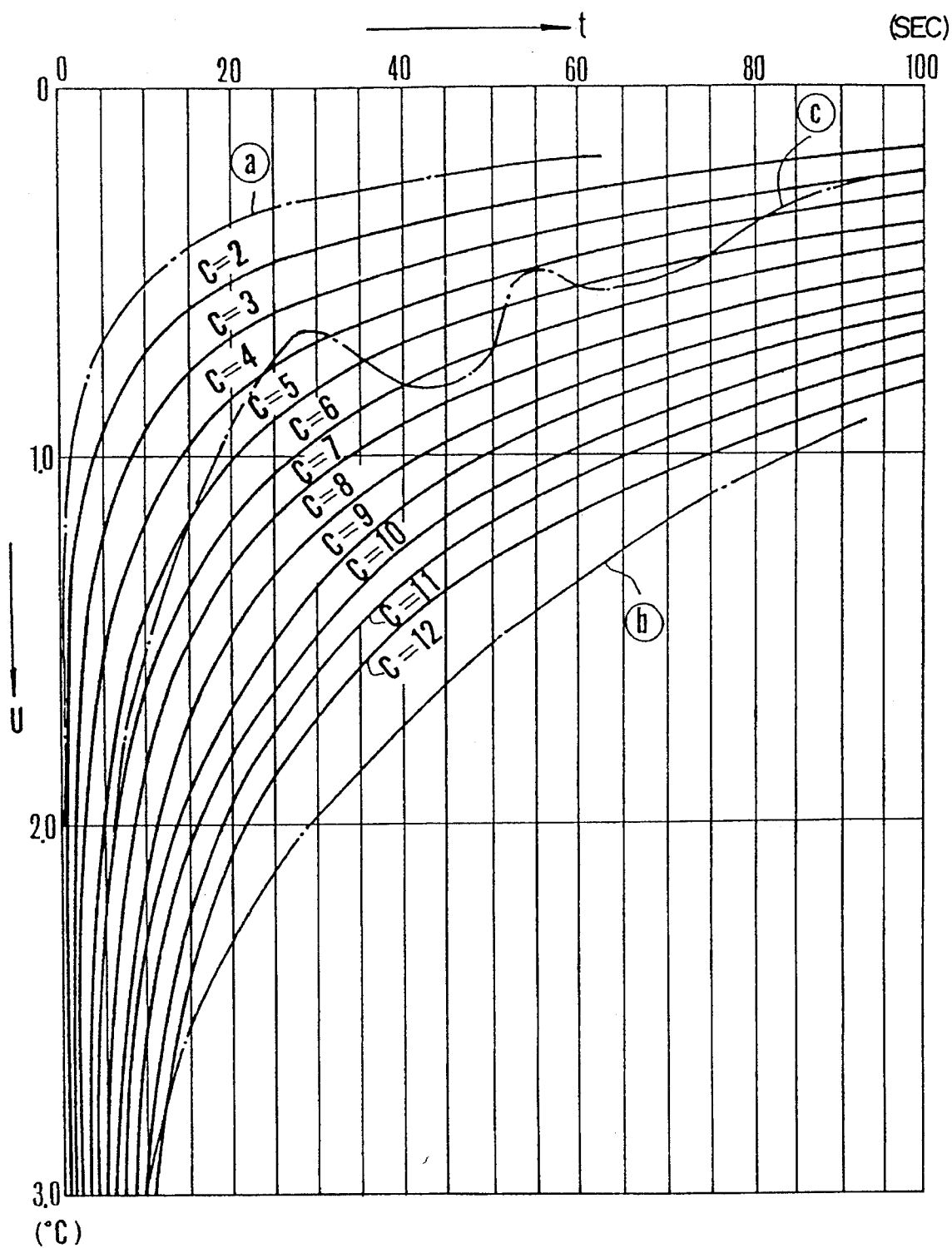
FIG. 6 is a graph illustrating a corrective temperature differential curve according to an embodiment of the invention.
Figure 7:
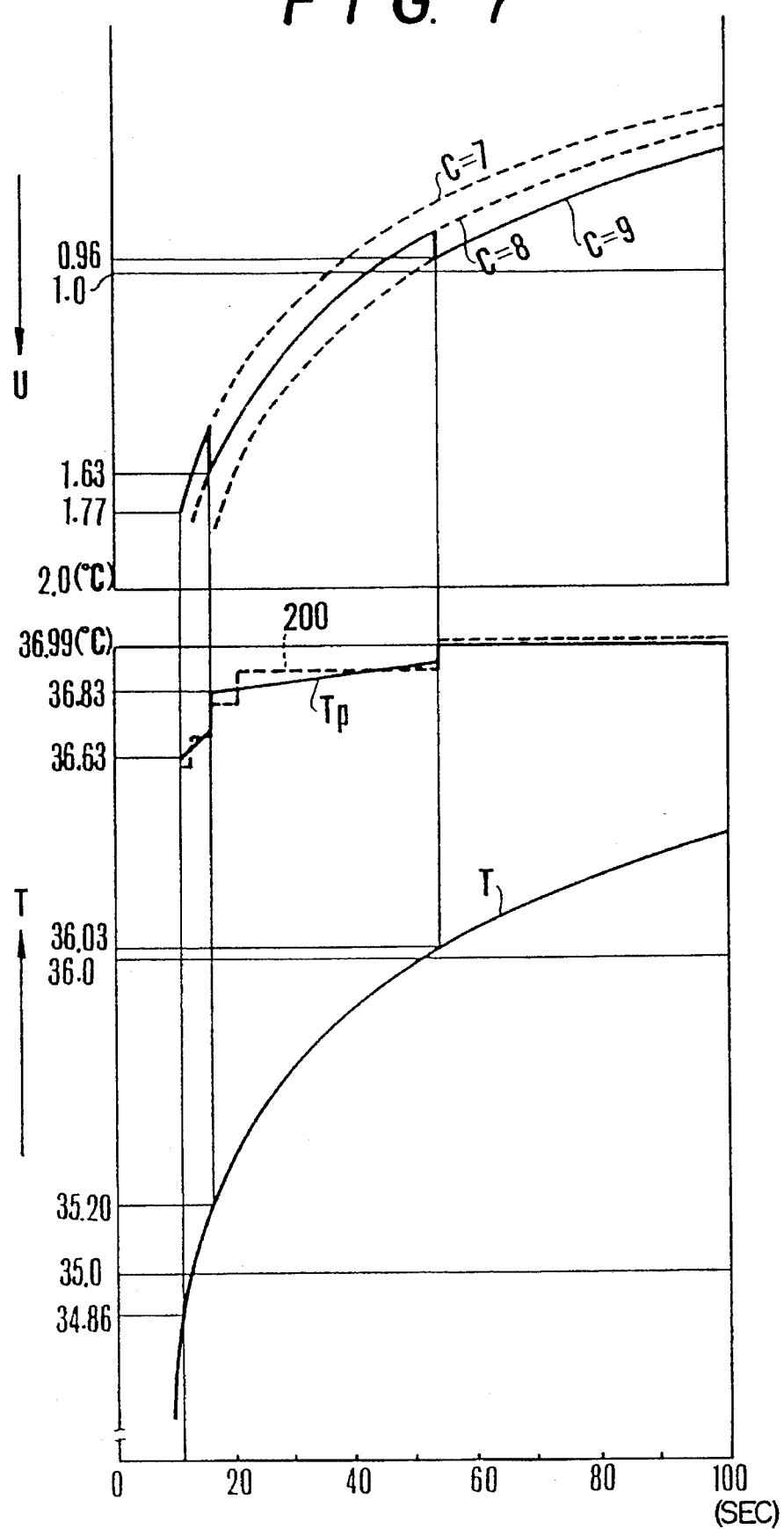
FIG. 7 is a graph illustrating a predicted temperature transition.
Figure 8:
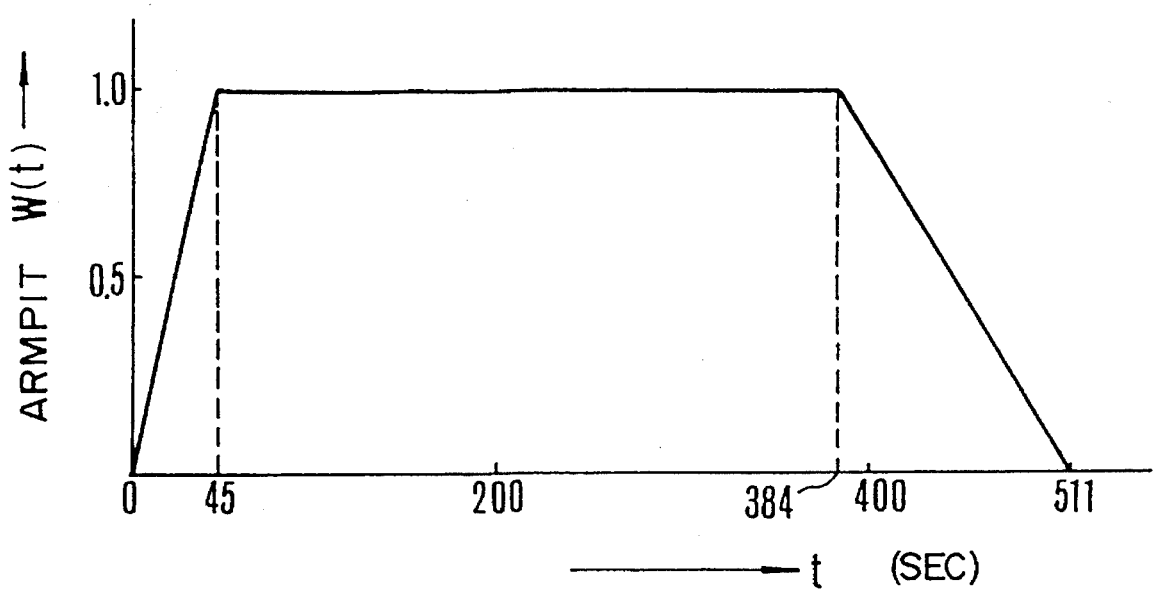
FIG. 8 is a graph indicating a weighting set for an electronic clinical thermometer used in an armpit.

The first computation gives as a result a point on the curve marked C=7 in FIGS. 6 and 7 and on the curve marked C=7 in FIG. 7. Accordingly, for t=11 sec, we have U=1.77° C. This is applied to the adding circuit 9 as the corrective value signal 18.

Adding step 114 calls for the adding circuit 9 to add the real-time temperature signal 14 and the corrective value signal 18 and deliver the sum to the predicted temperature monitoring circuit 10 as the predicted temperature signal 19. For example, since U=1.77° C. in the present example, and if T(11)=34.86° C. Tp=36.63° C. will be applied to the monitoring circuit 10 by the adding circuit 9 upon performing the addition Tp=T(11)+U(11). The monitoring circuit 10 will receive two values of the predicted temperature Tp at a certain time interval for the same value of C. In a decision step 115, therefore, the predicted temperature Tp is investigated for any increase or decrease from one arrival to the next.

Three decisions are capable of being rendered in step 115 by comparing the change in Tp with a certain value a. If the decision is $dTp/dt \geq a$, this indicates that an equilibrium temperature higher than that predicted at the present time can be expected. Accordingly, the process moves to a step 111 to increase the value of the parameter C.

If the decision is $dTp/dt \leq -a$, then this indicates that an equilibrium temperature lower than that predicted at the present time can be expected. The process therefore moves to a step 124 to decrease the value of the parameter C. For $|dTp/dt| < a$, the indication is that the equilibrium temperature predicted at the present time lies within limits where said temperature can be regarded as being approximately equal to the equilibrium temperature predicted previously. Therefore, the selected temperature prediction function is deemed to be on the right track for a real-time temperature measurement, and processing moves to step 116 for forming a predicted display temperature.

In steps 124,127, the negative feedback control signal 20 from the monitoring circuit 10 is applied to the corrective value computing circuit 8 to change the parameter C. The value of the new parameter C is checked within the computing circuit 8 in accordance with steps 126, 129 and is used as the parameter in step 113 for recomputation of the corrective value providing that upper and lower limits are not exceeded, i.e. provided that the increased parameter C does not exceed the set upper limit value 12 in decision step 129, and that the decreased parameter C does not fall below the set lower limit value 2 in decision step 126.

However, in cases where the parameter C exceeds the upper limit value 12 in decision step 129, and falls below the set lower limit value 2 in decision step 126, it is decided that the real-time temprature signal 14 is outside predictable limits of the prediction function. In other words, there is no probability of a coincidence of the curves drawn by the prediction function and the real-time temperature-signal. Curves (a) and (b) in FIG. 6 depict curves with no probability of coincidence. The curve (a) indicates an equilibrium temperature higher than that which it is possible to reach and the curve (b) indicates that an equilibrium temperature lower than that which it is possible to reach. In either case, therefore, it is meaningless to display the predicted equilibrium temperature, flag FLP is reset in step 122, direct reading mode is indicated on display unit 3, and the real-time temperature is displayed in step 123.

It should be noted that the curves (a) and (b) should not be restricted to the form depicted in the drawing. They may take any form.: Whenever decision steps in 126 or 129 make a decision that the curves are exceed the conditions, it denies absolutely the possibility of coincidence between the curve and the prediction function. Curves (a) and (b) are conceived to show typical curves for which it is impossible to perform a prediction of the equilibrium temperature. Therefore, to evaluate the curves (a) and (b) are equivalent to evaluate any and all temperature rise curves which do not fall within the range of a group of standard curves prepared as prediction functions. With regard to a curve (c), no decision has been made that it exceeds conditions in step in 126, 129. No decision has thus been made on the possibility of coincidence because there remains some possiblity for establishing prediction at that instant.

Now, control goes to step 116 and calls for adding "1" to the counter N because the predictive equilibrium temperature at two successive sampling instants are found to be in coincidence. That is, at this instant, it may be supposed that a part of both the curve of real-time temperature and that of drawn by the selected prediction function coincide. In decision step 117, the magnitude of the corrective value U(t) is evaluated. When U(t)<0, the measurement mode is changed to the direct reading mode because there is no value to be added on. Such situation will be produced after considerable measurement time has elapsed. More precise measurement can be expected by placing the thermometer in the state of direct reading mode When, U(t)≧0.1 the value of the counter N is examined in step 118. Where the corrective value U(t) is larger or equal 0.1, the clinical thermometer exhibits its greatest predictive ability. In step 118, if the number of N in the counter is not larger than 3, the prediction is still uncertain, and the processing goes to back to step 110. If the value of the counter N is larger than 3, it indicates that the predictive equilibrium temperature Tp of four successive sampling instants approximately coincide; thus both the curve of the real-time temperature and the selected prediction curve are assumed to be largely coincident. Then processing moves to step 119 and sets FLP at "1", thereby establishing the validity of the prediction. If this is occuring for the first time, a buzzer sound is generated. It is needless to say that the establishment of prediction validity also may be indicated by setting the counter N to "1".

The step 120 calls for weighting (described later) to be performed in order to form the predicted display temperature. The display step 121 calls for the presently prevailing predicted display temperature signal 21 to be outputted by the adder 9 so that the predicted display temperature at the present point in time may be displayed by the display unit 3. When step 113 ends, the process returns to the corrective value computation step 101 while the predicted temperature remains displayed on the display unit 3.

Thus, after establishment of the validity of the predicton, the series of prediction operations is continued, whereby more precise temperature prediction is possible in accordance with user's volition. If the condition 0≦u(t)<0.1 is satisfied, the processing moves to step 120. At this stage, the add-on value becomes small, so that the accuracy of the prediction is sharply increased. Thus we can judge that the validity of the prediction is established at that stage.

Thus, the predicted temperature is displayed on the display unit, after such processing as rounding to the nearest whole number, only when the condition |dTp/dt|<a is satisfied. The displayed value is retained until the next display step. The processing loops such as steps for arithmetic operation or display is controlled by the measurement control circuit 7 so as to be repeated at a predetermined interval of, say, one second.

Where the curve of the real-time temperature describes curve (c) in FIG. 6, the validity of the prediction is not readily established. Temperature rising data shows an unstable transient if poor contact of the probe with the skin is maintained for some time, or the probe virtually loses contact with the region. If this kind of situation continues for the first predetermined time period T1, a decision Yes is rendered in step 110, and processing moves to step 111 where the state of the flag FLG has not been set. The measurement state is changed into the direct reading mode because it cannot expect to correctly measure the temperature even if the prediction mode is continued in such measurement circumstance. When the setting of flag FLP is confirmed in step 111, processing moves to step 112 where it is confirmed whether the second predetermined time period T2 has elapsed or not. By way of example, the second predetermined time period T2 is a time period such that sufficient measurement time has elapsed since the initiation of measurement that no add-on value is necessary. As will be described later, the add-on value becomes 0 when 8 minutes 30 seconds of measurement time has elapsed in the case of armpit measurement, and 6 minutes 30 seconds in the case of oral measurement. Accordingly, measurement is changed to the direct reading mode when such condition of time elapse is satisfied according to the manner of measurement (i.e. oral or armpit measurement). If the user continues measurement after the buzzer sound is generated, the time T2 will soon expire and, he will see both the indication of the direct reading mode as well as the measurement data.

In the example of FIGS. 3 and 4, the algorithm alters the value of the parameter C in increments or decrements of one. In such case the resolution of the predicted temperature will be on the order of 0.1° C. at about 50 seconds into the prediction computations. To obtain even greater resolution, therefore, the value of the parameter C should be incremented or decremented by 0.5 in steps 124 or 128. Further, the value of a in the decision step 110 need not be constant. It can, for example, be a function the value of which diminishes with time. Such an expedient is preferred in view of the fact that the temperature difference separating one corrective temperature curve from another in FIG. 6 grows smaller with the passage of time. To compute dTp/dt, obviously various methods are conceivable using a running average or three values of Tp separated widely in time, so long as there is no significant influence upon the accuracy of measurement. In any case, even when the display step 121 is eventually selected as the result of the decision in step 115, processing returns to step 115 through the corrective value computation step 113 and adding step 114 for computation of Tp. During the repeated execution of this loop, the computation for predicting temperature is regarded as following the actual temperature change. Accordingly, the computed value of the predicted equilibrium temperature will stabilize and the displayed value thereof will make a smooth and rapid transition. The corrective value U will follow e.g. the curve C=7 in FIG. 7.

At time t=16 sec, the decision rendered in step 115 is dTp/dt≧a, after which the process moves to step 127 where the parameter C is incremented to 8. On the curve C=8, we will have U=1.63° C. If T=35.20° C. at such time, then the result of computation in step 114 will be Tp=36.83° C. Now, in accordance with step 115, two values of the predicted temperature (i.e. two values taken at a certain time interval), for the same C (=8), are checked. As long as the change in Tp does not exceed a certain value, the loop which includes the display step, 121 is stepped through repeatedly, so that a value of Tp in the neighborhood of 36.8° C. is obtained continuously. As will be described below, weighting at this time is 36%, so that the substantial display temprature is lower than 36.8° C. At time t=53 sec, the program proceeds to the loop decided by dTp/dt≧a, so that the curve tracked is indicated by C=9. Since U=0.96° C., T=36.03° C. will now hold, the result of calculation in step 120 will be Tp=36.99° C. As will be described below, weighting at this time is 100%, so that the substantial display temperature is 36.99° C. From this point onward the prediction of temperature proceeds along the curve C=9. The value of Tp being rounded off is as indicated by the dashed line 200 in FIG. 7.

Thus, as described hereinabove, body temperature which will prevail at thermal equilibrium is predicted and displayed substantially continuously.

In the algorithm illustrated in FIGS. 4 and 5, the parameter C is intially set to the value of 7 in step 107. By doing so, however, there may be instances where the displayed value diminishes with time, owing to the method of processing or the way in which the value of a is selected in the decision step 115 for monitoring the predicted temperature. To give the operator a more natural impression of temperature transition, therefore, C can be set initially to 2 in step 107, so that the displayed value will, in general, rise with the passage of time. Thus, parameter selection causes the equilibrium temperature to be rapidly approached with respect to elapsed measurement time.

Figure 9:
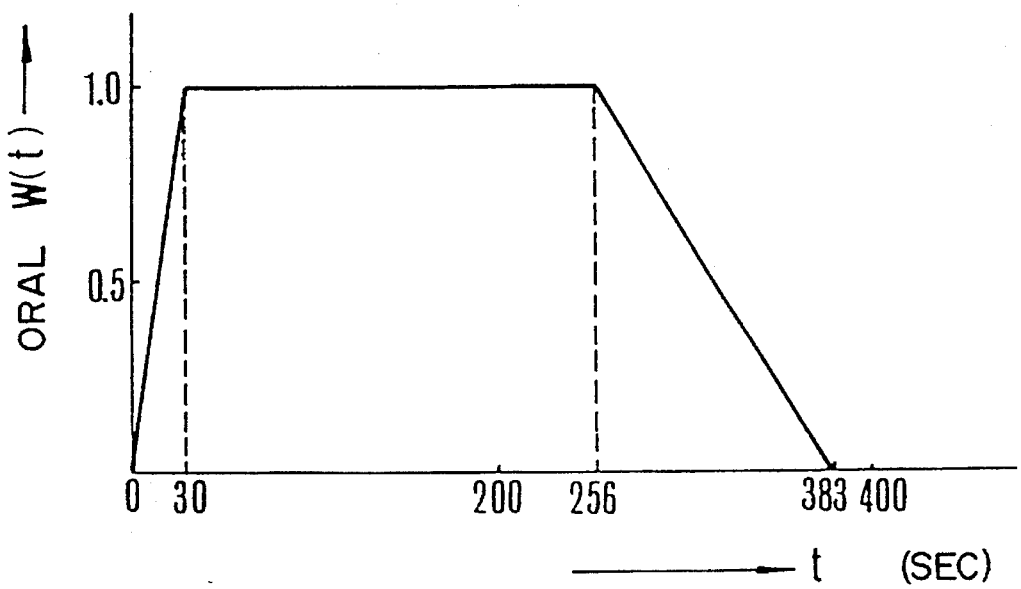
FIG. 9 is a graph indicating a weighting set for an electronic clinical thermometer used orally.
Figure 10:
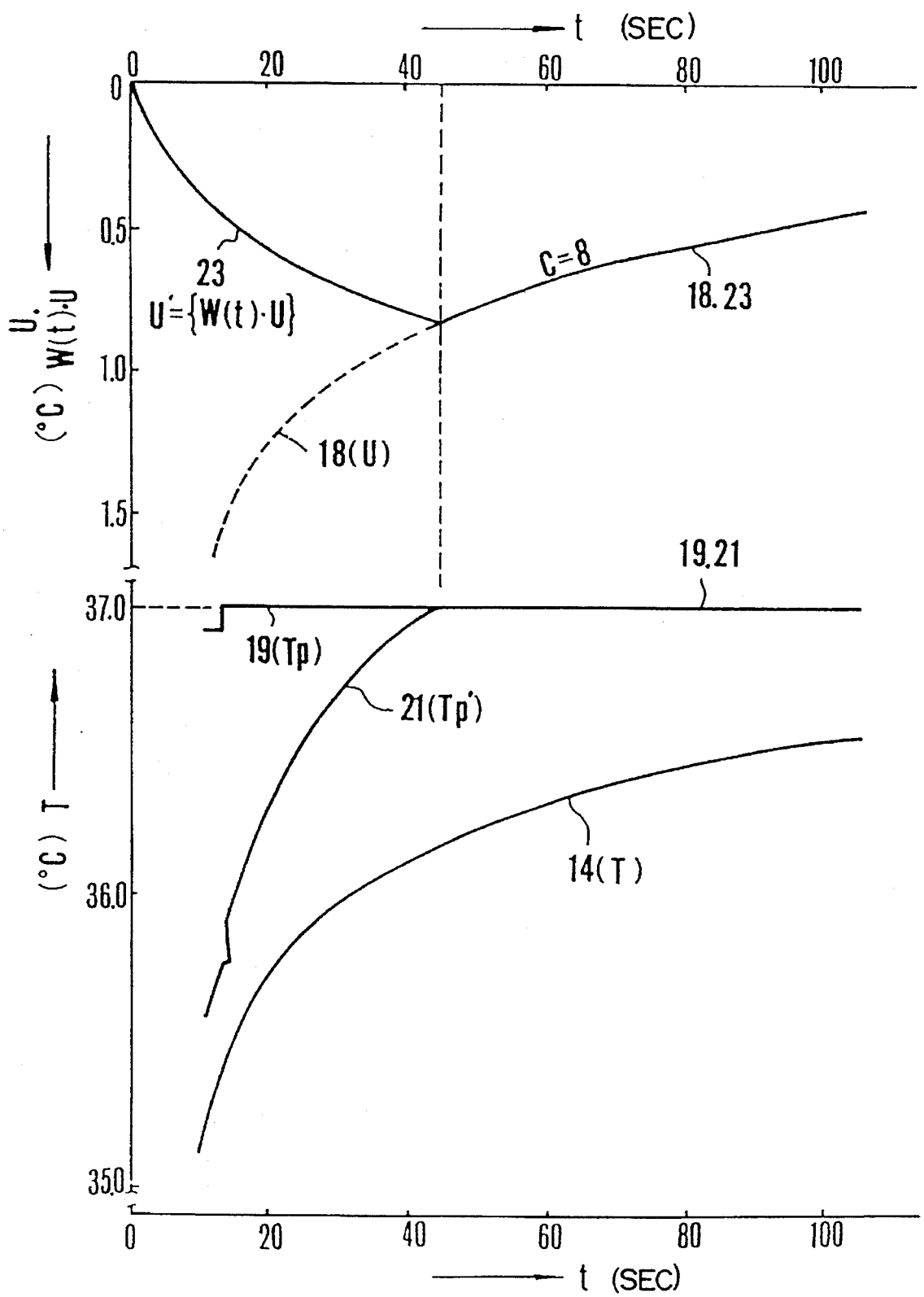
FIG. 10 is a graph useful in describing the transition of a predicted display temperature from the start of measurement in an armpit.

FIGS. 9 and 10, illustrate a change in weighting with respect to elapsed measurement time, in which FIG. 9 is a graph of weighting set for temperature measurement in an armpit and FIG. 10 is a graph set for temperature measurement taken orally. These graphs are example of weighting characteristics determined statistically and on the basis of experience taking into consideration differences in the thermal equilibrium characteristics of the part of the body measured.

Generally, sensed temperature immediately after the thermometer is contacted with the body exhibits a steep temperature variation. The abovementioned add-on value for this portion of the temperature curve is large in magnitude. Until the prediction function selected is an appropriate one, therefore, the add-on value also undergoes a discontinuous and large-scale variation due to the changing of the prediction function. Consequently, if the add-on value during this interval of time were added on as is, the predicted temperature display would be unstable and difficult to read. Accordingly, until passage of a predetermined period of time from the start of measurement, the corrective value computing circuit 8 subjects the add-on value (corrective value signal 18) obtained to weighting having a linearly increasing characteristic. For example, if the temperature measurement is taken in the armpit, then weighting having a slope that will raise the add-on value to 100% is applied until 45 seconds elapse from the start of measurement. If the temperature measurement is taken orally, then weighting having a slope that will raise the add-on value to 100% is applied until 30 seconds elapse from the start of measurement.

When the first predetermined time period elapses, the rise in the sensed temperature becomes more gentle and the add-on value for this portion of the curve also falls within a suitable range. From this point onward, the rapidity at which the prediction converges toward the final temperature and the accuracy of the prediction become important factors.

Accordingly, when the first predetermined time period elapses, the correcting value computing circuit 8 subjects the add-on value (the corrective value signal 18) obtained to 100% weighting until the elapse of a second predetermined time period. This is equivalent to not executing weighting processing. By way of example, the second predetermined time period is 348 seconds (six minutes and 24 seconds) from the start of measurement in case of armpit measurement and 256 sec (four minutes and 16 seconds) from the start of measurement in case of oral measurement.

When the second predetermined time period elapses, the sensed temperature itself falls within a range close to the equilibrium temperature. When this much time has passed, the merits of performing a prediction diminish and it is better to shift to a direct display-type function. Accordingly, when the second predetermined time period elapses, the corrective value computing circuit 8 subjects the add-on value (corrective value signal 18) to weighting having a linearly decreasing characteristic until passage of a third predetermined time period. By way of example, for measurement taken in an armpit, weighting having a slope for a weighting transition of 100% to 0% is performed from a point 384 seconds after the start of measurement until a point 511 seconds after the start of measurement (8 minutes and 31 seconds). For measurement taken orally, weighting having a slope for a weighting transition of 100% to 0% is performed from a point 256 seconds after the start of measurement until a point 384 seconds after the start of measurement (6 minutes and 24 seconds). The continuity of the displayed temperature is maintained by not suddenly applying 0% weighting in this time interval. In other words, a smooth and gradual transition is made to the direct reading state by gradually reducing the percentage occupied by the add-on value.

When the third predetermined time period elapses, the sensed temperature itself indicates the thermal equilibrium temperature. From this point onward, therefore, the add-on value is 0. The electronic clinical thermometer of the present embodiment thenceforth functions as a conventional direct reading-type clinical thermometer and temperature can be measured until the user is satisfied. The displayed temperature is thus enabled to make a smooth transition with the passage of time. The requirement for a rapid display of predicted temperature as well as an accurate direct reading of temperature is thus satisfied.

FIG. 10 is a graph useful in describing the transition of a predicted display temperature from the start of measurement in an armpit. By way of example, the prediction function associated with a parameter C=8 being selected at the present point in time is prescribed at the corrective value signal 18, as illustrated in FIG. 10. It will be understood that when the selected parameter C=8 matches the rising curve of the real-time temperature signal 14, the predicted temperature signal 19 rapidly attains the thermal equilibrium temperature. Accordingly, if an appropriate parameter selection is always made, the predicted temperature signal 19 will be displayed, whereby an ideal temperature display is obtained. However, since the initially set value of the parameter C is a statistically determined value having the highest probability of leading to a temperature prediction at thermal equilibrium, the parameter C will not necessarily match the real-time temperature signal 14 at an early time. When matching is not achieved, the predicted temperature Signal 19 will probably make an unstable transition due to the changeover of the prediction function. For example, there are cases where the predicted temperature signal initially exhibits a value higher than the equilibrium temperature and then gradually decays, and cases where the predicted temperature signal is initially quite low and then rises sharply. Accordingly, elapsed-time weighting shown in FIG. 6(a) is applied to the add-on value U(t) of the prediction function in the time interval from the start of measurement to the instant 45 seconds thereafter. As a result, the corrective value signal 23 for display purposes is calculated in accordance with U'=W(t) U(t), the signal starting at a value of 0 and then gradually rising. In the time interval from the start of measurement until 45 seconds thereafter, therefore, the display temperature signal 21 is smaller than the predicted temperature signal 19, rises smoothly and quickly attains the equilibrium temperature before the real-time temperature signal 14. Forty-five seconds after the start of measurement, a continuous, accurate and stable display of equilibrium temperature is achieved.

Figure 11:
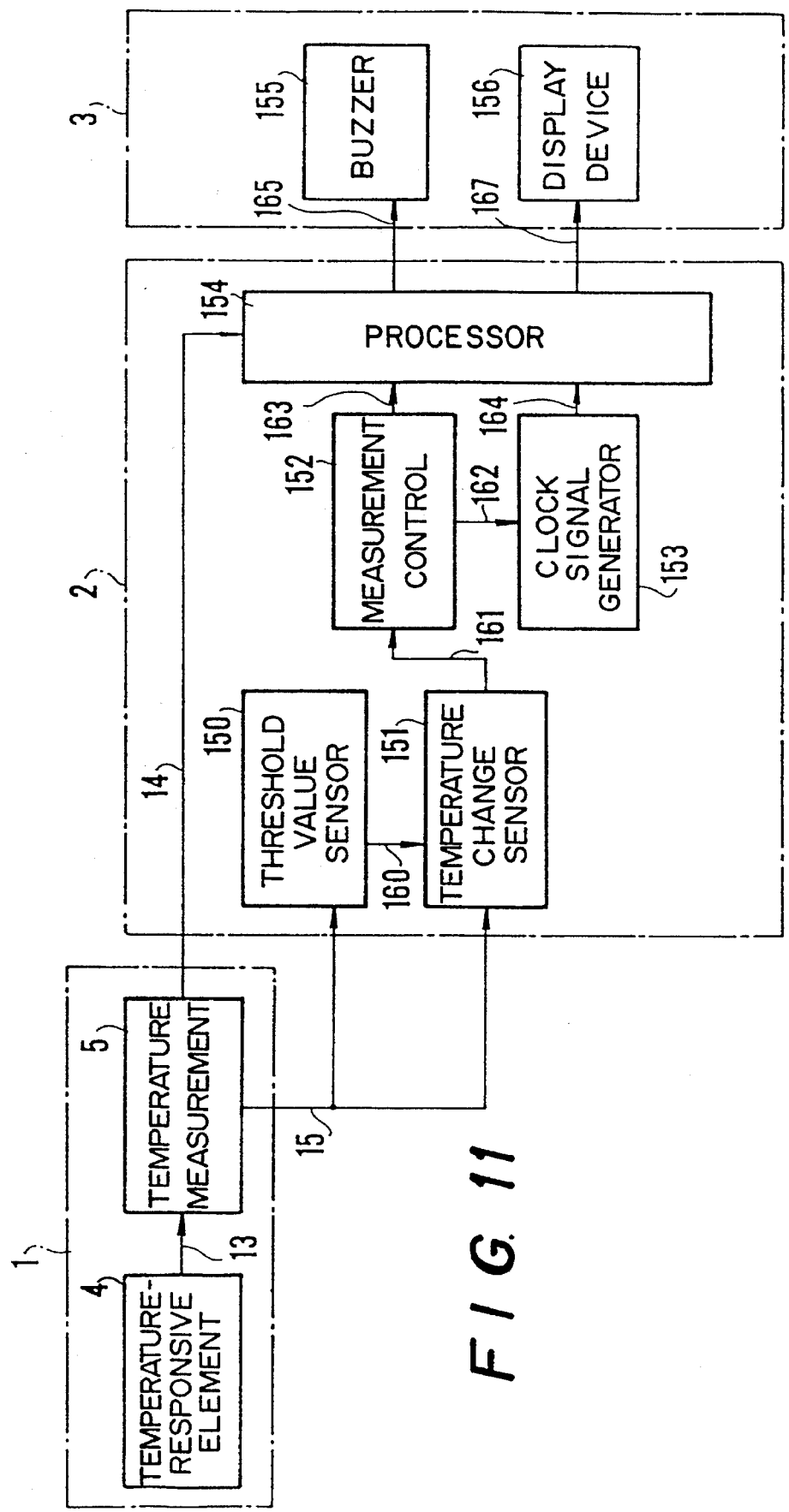
FIG. 11 is a block diagram illustrating the electronic clinical thermometer in a case where the thermometer comprises a microcomputer.

With the present state of the art, a hardware arrangement of the kind shown in FIG. 11, which makes use of a microcomputer, is well suited for implementing the complicated temperature prediction algorithm of the kind shown in FIGS. 3 and 4. Elements in FIG. 11 similar to those shown in FIG. 2 are designated by like reference numerals.

In FIG. 11, the temperature signal 14 from the temperature measuring circuit 5 is applied as an input to a processor 154 constituting part of the arithmetic unit 2. The temperature signal 15 from the temperature measuring circuit 5 is applied as an input to a temperature threshold value sensing circuit 150 and to a temperature change sensing circuit 151. The sensing circuit 150, which executes step 102, comprises a comparator for determining whether the temperature T expressed by signal 15 has exceeded a threshold temperature Tth, producing a signal 160 when such is the case. The temperature change sensing circuit 151, which executes step 103, determines whether the change in the temperature T with time, represented by signal 15, has exceeded a predetermined value k, and produces a control signal 161 when such is the case.

The control signals output 161 of the temperature change sensing circuit 151 is connected to a measurement control circuit 152. The latter produces an output 162 applied to a clock signal generating circuit 153, and an output 163 applied to the processor 154. The measurement control circuit 152 responds to the control signal 161 by actuating the clock signal generating circuit 153, and instructs the processor 154 to execute the process steps from step 105 onward. The clock pulse generating-.circuit 153 produces a clock pulse output 164 supplied to the processor 154, the latter responding by executing the aforementioned processing steps from step 107 onward in e.g. FIGS. 4 and 5. In the illustrated embodiment the processor 154 can be realized in the form of a single-chip microcomputer.

The display unit 3 in FIG. 9 includes a buzzer circuit 155 for an audible alarm, as well as a display device 156. The buzzer 155 is for informing the user of an error condition or % of the fact that suitability of a prediction has been detected. The display device 156 is for displaying the predicted display temperature.

EFFECT OF THE INVENTION

In accordance with the invention as described above, predictive calculations are performed quickly and effectively if an ordinary temperature rise curve falls within the range of a group of standard curves prepared as prediction functions. In case of an unstable temperature rise curve that exhibits a transition not covered by the group of standard curves, the prediction operation is suspended immediately and the actually measured temperature value is displayed at such time. This is to prevent obtaining an unreliable prediction based on the unstable curve. Accordingly, this makes it possible to indicate the correct body temperature value at all times under a wide variety of body temperature measurement conditions.

As many apparently widely different embodiments of the present invention can be made without departing from the spirit and scope thereof, it is to be understood that the invention is not limited to the specific embodiments thereof except as defined in the appended claims.

What is claimed is:

1. An electronic clinical thermometer comprising:

temperature sensing means for sensing body temperature at a prescribed part of a body;

means for measuring elapsed time from a start of measurement;

memory means for storing weighting factors which are selectable in response to the time elapsed from the start of measurement;

arithmetic means for obtaining a corrective value at a measured elapsed time utilizing one selected prediction function, according to the measured elapsed time, from among a plurality of prediction functions;

predictive calculation means for calculating an equilibrium temperature by adding the obtained corrective value to the sensed body temperature at the measured elapsed time;

measuring mode setting means for setting a measurement mode to one of a predictive measurement mode and a direct measurement mode, wherein the measurement mode is initially set to the predictive measurement mode and changed over to the direct measurement mode after a predetermined measured elapsed time; and display means for displaying a temperature value obtained using the measurement mode in which the thermometer is set.

2. An electronic clinical thermometer according to claim 1, wherein the display means displays the temperature value determined by the predictive measurement mode and the temperature value determined by the direct measurement mode in such a manner that it is possible to discriminate which is being displayed.

3. An electronic clinical thermometer comprising:

temperature sensing means for sensing body temperature at a prescribed part of a body;

means for measuring elapsed time from a start of measurement, and for generating an elapsed time signal which indicates the measured elapsed time;

arithmetic means for obtaining a corrective value at a measured elapsed time utilizing one selected prediction function at one time from among a plurality of prediction functions, each prediction function defining a temperature change as a function of measured elapsed time, up to a final temperature;

predictive calculation means for calculating an equilibrium temperature based upon the obtained corrective value and the sensed body temperature at the measured elapsed time used by the arithmetic means to determine the corrective value;

measuring mode setting means for setting a measuring mode of the thermometer;

direct reading means for directly reading the body temperature sensed by the temperature sensing means;

evaluating means for evaluating a possibility of establishing a prediction of body temperature;

means for changing the-measuring mode from a prediction measuring mode to a direct reading mode in accordance with the evaluation made by the evaluating means; and displaying means for displaying a temperature value obtained by the measuring mode in which the thermometer is set.

4. An electronic clinical thermometer according to claim 3, wherein the evaluating means evaluates a possibility of establishing prediction of body temperature based upon the magnitude of a parameter used by the predictive calculation means.

5. An electronic clinical thermometer according to claim 3, wherein the evaluating means uses measured elapsed time as an evaluating element for evaluating the possibility of establishing prediction of body temperature.

6. An electronic clinical thermometer according to claim 3, wherein the display means further includes means for displaying the measuring mode in which the thermometer is set.

* * * * *